E. B. MEYROWITZ.
SCREWLESS MOUNTING.
APPLICATION FILED OCT. 20, 1914.

1,190,932.

Patented July 11, 1916.

Witnesses:

Inventor
Emil B. Meyrowitz
By his Attorneys

UNITED STATES PATENT OFFICE.

EMIL B. MEYROWITZ, OF NEW YORK, N. Y., ASSIGNOR TO GENERAL OPTICAL COMPANY, INC., A CORPORATION OF NEW YORK.

SCREWLESS MOUNTING.

1,190,932. Specification of Letters Patent. Patented July 11, 1916.

Application filed October 20, 1914. Serial No. 867,567.

*To all whom it may concern:*

Be it known that I, EMIL B. MEYROWITZ, a citizen of the United States, residing at the city of New York, in the borough of Manhattan and State of New York, have invented certain new and useful Improvements in Screwless Mountings, of which the following is a full, clear, and exact description.

This invention relates to lens mounts for rimless eyeglasses and spectacles, and more especially to so-called "screwless" mountings.

Until the more recent developments of this art, the common means employed for rigidly securing the lens to the mounting comprised a post which carried at its outer end a strap having two projecting lugs between which the lens was positioned and to which it was secured by means of a screw passing through apertures in the lens and lugs, respectively. As is well known, this screw frequently becomes loose, permitting relative movement of the lens and mounting, much to the annoyance of the wearer. It has therefore been attempted to provide a so-called "screwless" mounting in which the lens is rigidly secured to the mounting by a construction whereby the necessity for this fastening screw is obviated, various constructions having been employed for this purpose which have not been entirely satisfactory.

It is therefore the object of my invention to provide a new and improved form of "screwless" mounting which is of a simple construction and permits the ready assemblage of the parts and when assembled, will provide a rigid connection which is extremely unlikely to become loose and in which the liability of the portion of the lens, which forms the connection breaking away from the lens, is reduced to a minimum. To achieve these objects, I provide in the peripheral edge of the lens, a transverse slot of increased width at its inner end with which I use a stud or post having a flattened head of a shape similar to the shape of the slot in the lens into which, it is adapted to fit snugly so that it may only move laterally therein. Positioned over the post or stud is a strap having side flanges which clamp over the faces of the lens and cover the head of the post preventing lateral displacement thereof and since the slot is of increased width at its inner end, the walls of the slot will engage and lock the stud against longitudinal movement thereby providing a rigid connection which cannot thereafter become loose.

Figure 1:
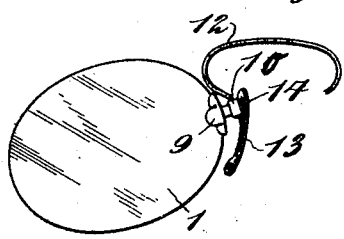
Figure 2:
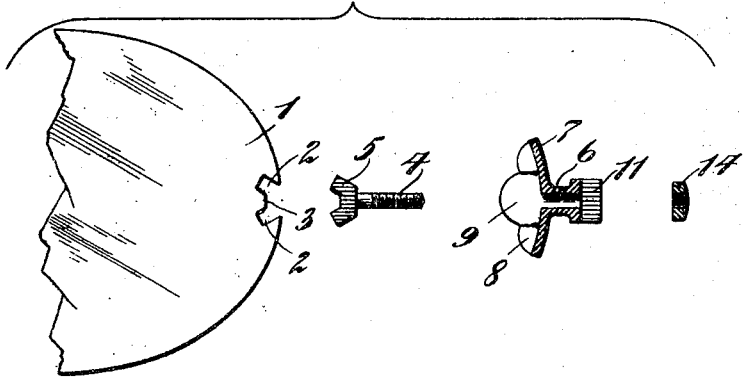
Figure 3:
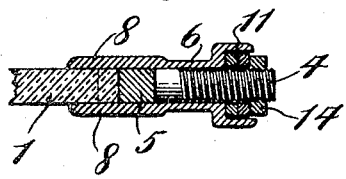

In the accompanying drawings: Figure 1 shows a portion of a pair of rimless eyeglasses in which the lens is secured to the mounting in accordance with the preferred construction of my invention; Fig. 2 is a view on an enlarged scale showing the various parts of the lens mount before assembling; and Fig. 3 is a transverse section through the lens mount on an enlarged scale.

In the drawings, 1 designates the lens which may be of any suitable size and shape adapted for use with rimless eyeglasses or spectacles. A notch or slot is cut in the peripheral edge of the lens as at 2, which slot extends a slight distance inwardly and in the preferred embodiment of my invention, the walls of the slot diverge, the inner face of the slot being provided with a substantially semi-circular projection 3. A stud or post which comprises a threaded shank 4 and a head 5, is the means used for securing the lens to the other parts of the mounting. The head 5 is rectangular is cross section and is of substantially the same thickness as the lens. In the preferred embodiment of my invention, a forked shaped head is used which fits snugly into the correspondingly shaped slot in the lens. In securing this post or stud in place, the same is placed or fitted laterally into the slot in the lens and is secured therein by a suitable cement, which is commonly used for this purpose. Adapted to fit loosely over the post is a sleeve 6 carrying a strap 7, having slotted side flanges 8 spaced apart a sufficient distance to engage over the faces of the lens and clamp the same between them. The medial portions of the side flanges are preferably of increased width and forms a somewhat semicircular lug 9 or projection which is of sufficient size to cover the head of the post when the parts are assembled. Cement is also preferably used in securing the strap securely to the lens.

Preferably integral with the sleeve 6 is a box 10 provided with a square recess 11 which receives a flat bow spring or bridge 12. This spring or bridge may carry at its lower end the nose guard 13. The threaded stud passes through an aperture in the spring which is secured in place in the box by means of a nut 14 threaded on the end of the post 5 which nut also serves to force the strap against the peripheral edge of the lens. Since the strap clamps against the faces of the lens it will prevent any lateral movement of the stud, which, owing to its shape is also prevented from a longitudinal movement so that a rigid connection is provided which cannot in any way become loose after the mounting is assembled.

As will be clear from Fig. 2, the walls of the slot 2 which are subjected to strain, are of comparatively short length and since they are integral with the remaining portions of the lens, there is very little liability of a piece of the lens breaking off and the lens freed from the mounting. While I deem the form of slot and shape of head shown is preferable, yet it is apparent that the same may be varied widely, as for example, instead of a somewhat fork-shaped slot shown, an L-shaped, a T-shaped slot or a slot having an enlarged circular chamber at its inner end, may be used, in each instance it being desirable that the stud cannot be pulled longitudinally from the slot, but is free to be fitted into and removed laterally from the slot, and in so far as I am aware, this construction, together with a separate strap having side flanges which clamp over the faces of the lens and cover the notch and slot, is novel to me, and it is not my intention to be limited to any specific embodiment, but only by the scope of the appended claims. It may also be stated that while I have disclosed my invention associated with a pair of rimless eyeglasses of the usual type, the invention is not limited to this particular embodiment, but is equally applicable to all forms of rimless eyeglasses and spectacles; when used with the spectacles, the bridge may be soldered to the box and the sleeve reduced in length or entirely omitted; the stud would however pass through the box as before and would have some form of fastening means such as a nut threaded on its end.

I claim:—

1. In a lens mount, a stud having a flatted head, a lens having a notch in its peripheral edge into which said head fits and from which it is only laterally displaceable, and a separate strap mounted on said stud and having side flanges covering said head and clamped to the faces of said lens.

2. In a lens mount, a lens having a slot extending inwardly from its peripheral edge and of increased width at its inner end, a stud having a flatted head filling said slot and fitting snugly therein, and a separate strap mounted on said stud having side flanges covering said head and clamped to the faces of said lens.

3. In a lens mount, a lens having a slot extending inwardly from its peripheral edge and of increased width at its inner end, a stud having a flatted head filling said slot and fitting snugly therein, a separate member mounted on said stud comprising a strap having side flanges covering said head and clamped against the faces of said lens, a box integral with said strap, a bridge or bow spring fitting into said box and fastening means on the end of said stud.

4. In a lens mount, a lens having a slot extending inwardly from its peripheral edge and of increased width at its inner end, a threaded stud having a flatted head filling said slot and fitting snugly therein, a separate member loosely mounted on said stud comprising a strap having side flanges covering said head and clamped against the faces of said lens, a sleeve carrying a box attached to said strap and a bridge having an opening therein through which said stud passes and a nut on the end of said stud securing said bridge in place in said box and for forcing said strap against the lens.

5. In a lens mount, a lens having a slot extending inwardly from its peripheral edge and of increased width at its inner end, an anchoring member filling said slot and fitting snugly therein, a separate strap having side flanges covering said anchoring member and means in the plane of the lens for drawing the strap member and anchoring member together.

In witness whereof, I subscribe my signature, in the presence of two witnesses.

EMIL B. MEYROWITZ.

Witnesses:
R. B. HAMILTON,
A. B. MURPHY.